United States Patent
Kim et al.

(10) Patent No.: US 11,468,283 B2
(45) Date of Patent: Oct. 11, 2022

(54) NEURAL ARRAY HAVING MULTIPLE LAYERS STACKED THEREIN FOR DEEP BELIEF NETWORK AND METHOD FOR OPERATING NEURAL ARRAY

(71) Applicant: SEOUL NATIONAL UNIVERSITY R&DB FOUNDATION, Seoul (KR)

(72) Inventors: Jaeha Kim, Seoul (KR); Yunju Choi, Incheon (KR); Seungheon Baek, Gyeonggi-do (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 979 days.

(21) Appl. No.: 15/854,923

(22) Filed: Dec. 27, 2017

(65) Prior Publication Data

US 2018/0121790 A1  May 3, 2018

Related U.S. Application Data

(63) Continuation of application No. PCT/KR2016/008386, filed on Jul. 29, 2016.

(30) Foreign Application Priority Data

Aug. 3, 2015 (KR) ........................ 10-2015-0109503

(51) Int. Cl.
*G06N 3/04* (2006.01)
*G06N 3/063* (2006.01)
*G06N 3/08* (2006.01)

(52) U.S. Cl.
CPC ............. *G06N 3/04* (2013.01); *G06N 3/0445* (2013.01); *G06N 3/0472* (2013.01); *G06N 3/063* (2013.01); *G06N 3/08* (2013.01); *G06N 3/084* (2013.01)

(58) Field of Classification Search
CPC ............. G06N 3/04; G06N 3/063; G06N 3/08
See application file for complete search history.

(56) References Cited

U.S. PATENT DOCUMENTS 8,856,055 B2   10/2014 Brezzo et al.
9,430,735 B1 *  8/2016 Vali ........................ G11C 7/106
(Continued)

FOREIGN PATENT DOCUMENTS

JP    H06-028331 A    2/1994
JP    H06-139218 A    5/1994
(Continued)

OTHER PUBLICATIONS

B. V. Benjamin et al., "Neurogrid: A Mixed-Analog-Digital Multichip System for Large-Scale Neural Simulations," in Proceedings of the IEEE, vol. 102, No. 5, pp. 699-716, May 2014, doi: 10.1109/JPROC.2014.2313565. (Year: 2014).*

(Continued)

*Primary Examiner* — Kakali Chaki
*Assistant Examiner* — Johnathan R Germick
(74) *Attorney, Agent, or Firm* — Dinsmore & Shohl LLP; Yongsok Choi, Esq.

(57) ABSTRACT

A neural array may include an array unit, a first processing unit, and a second processing unit. The array unit may include synaptic devices. The first processing unit may input a row input signal to the array unit, and receive a row output signal from the array unit. The second processing unit may input a column input signal to the array unit, and receive a column output signal from the array unit. The array unit may have a first array value and a second array value. When the first processing unit or the second processing unit receives an output signal based on the first array value from the array unit which has selected the first array value and then the array unit selects the second array value, it may input a
(Continued)

signal generated based on the output signal to the array unit which has selected the second array value.

9 Claims, 7 Drawing Sheets

(56) References Cited

U.S. PATENT DOCUMENTS

| | | | |
|---|---|---|---|
| 2014/0032464 A1* | 1/2014 | Esser | G06N 3/04 |
| | | | 706/26 |
| 2015/0170025 A1* | 6/2015 | Wu | G06N 3/0635 |
| | | | 706/25 |

FOREIGN PATENT DOCUMENTS

| | | |
|---|---|---|
| JP | H08-022446 A | 1/1996 |
| JP | 2015-095215 A | 5/2015 |
| KR | 10-2013-0114183 A | 10/2013 |
| KR | 10-2014-0054267 A | 5/2014 |

OTHER PUBLICATIONS

Izeboudjen, H. (1999). Digital implementation of artificial neural networks: From VHDL description to FPGA implementation. In Engineering Applications of Bio-Inspired Artificial Neural Networks (pp. 139-148). Springer Berlin Heidelberg. (Year: 1999).*

S. K. Kim, L. C. McAfee, P. L. McMahon and K. Olukotun, "A highly scalable Restricted Boltzmann Machine FPGA implementation," 2009 International Conference on Field Programmable Logic and Applications, Prague, Czech Republic, 2009, pp. 367-372, doi: 10.1109/FPL.2009.5272262. (Year: 2009).*

J. Lin and K. Boahen, "A Delay-Insensitive Address-Event Link," 2009 15th IEEE Symposium on Asynchronous Circuits and Systems, Chapel Hill, NC, USA, 2009, pp. 55-62, doi: 10.1109/ASYNC.2009.25. (Year: 2009).*

K. A. Boahen, "A burst-mode word-serial address-event link-l: transmitter design," in IEEE Transactions on Circuits and Systems I: Regular Papers, vol. 51, No. 7, pp. 1269-1280, Jul. 2004, doi: 10.1109/TCSI.2004.830703. (Year: 2004).*

K. A. Boahen, "A burst-mode word-serial address-event link-II: receiver design," in IEEE Transactions on Circuits and Systems I: Regular Papers, vol. 51, No. 7, pp. 1281-1291, Jul. 2004, doi: 10.1109/TCSI.2004.830702. (Year: 2004).*

Srinjoy Das and Bruno U. Pedroni and Paul Merolla and John V. Arthur and Andrew S. Cassidy and Bryan L. Jackson and Dharmendra S. Modha and Gert Cauwenberghs and Kenneth Kreutz-Delgado (2015). Gibbs Sampling with Low-Power Spiking Digital Neurons. CoRR, abs/1503.07793. (Year: 2015).*

Shah, N. et al. "Reading a 4-Bit SLC NAND Flash Memory in 180nm Technology." ICT (2010). (Year: 2010).*

S. Venkataramani, A. Ranjan, K. Roy and A. Raghunathan, "AxNN: Energy-efficient neuromorphic systems using approximate computing," 2014 IEEE/ACM International Symposium on Low Power Electronics and Design (ISLPED), 2014, pp. 27-32, doi: 10.1145/2627369.2627613. (Year: 2014).*

P. Merolla, J. Arthur, F. Akopyan, N. Imam, R. Manohar and D. S. Modha, "A digital neurosynaptic core using embedded crossbar memory with 45pJ per spike in 45nm," 2011 IEEE Custom Integrated Circuits Conference (CICC), 2011, pp. 1-4, doi: 10.1109/CICC.2011.6055294. (Year: 2011).*

O. Fujita and Y. Amemiya, "A floating-gate analog memory device for neural networks," in IEEE Transactions on Electron Devices, vol. 40, No. 11, pp. 2029-2035, Nov. 1993, doi: 10.1109/16.239745. (Year: 1993).*

Ahmad Muqeem Sheri, Aasim Rafique, Witold Pedrycz, & Moongu Jeon (2015). Contrastive divergence for memristor-based restricted Boltzmann machine. Engineering Applications of Artificial Intelligence, 37, 336-342. (Year: 2015).*

International Search Report of PCT/KR2016/008386 dated Nov. 7, 2016.

* cited by examiner

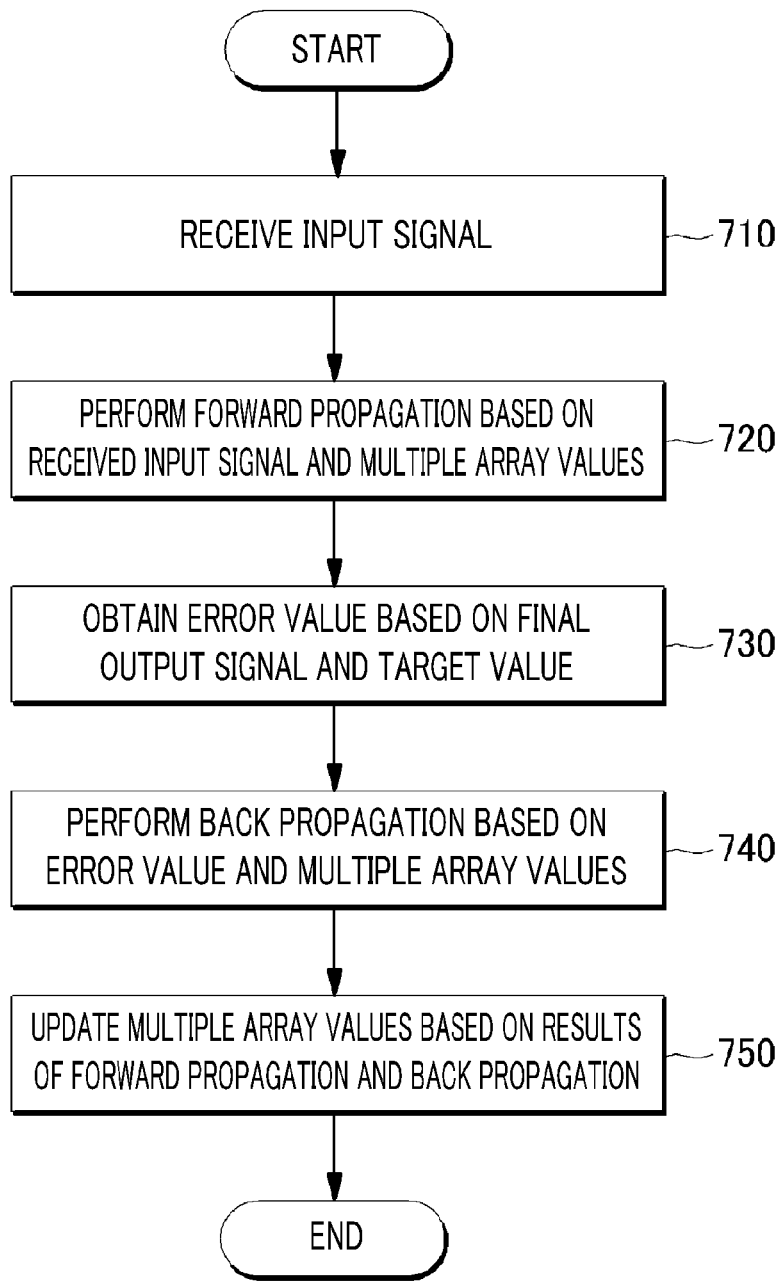

NEURAL ARRAY HAVING MULTIPLE LAYERS STACKED THEREIN FOR DEEP BELIEF NETWORK AND METHOD FOR OPERATING NEURAL ARRAY

CROSS-REFERENCE TO RELATED APPLICATIONS

This application is a continuation application of Patent Cooperation Treaty (PCT) international application Serial No. PCT/KR2016/008386, filed on Jul. 29, 2016, which designates the United States and claims priority to Korean Patent Application Serial No. 10-2015-0109503, filed on Aug. 3, 2015. The entire contents of PCT international application Serial No. PCT/KR2016/008386, and Korean Patent Application Serial No. 10-2015-0109503 are hereby incorporated by reference.

TECHNICAL FIELD

The present disclosure relates to a neural array and a method for operating the neural array.

BACKGROUND

Unless otherwise indicated herein, the approaches described in this section are not prior art to the claims in this application and are not admitted to be prior art by inclusion in this section.

Recently, research on a system including a neural device has continued. The system including a neural device can implement a computer different from a conventional Von Neumann type computer and may have design flexibility and energy and space efficiency.

The system including neural devices can process and learn data in a manner analogous to that of a biological brain. Typically, a neural device is connected with other neural devices through synapses of the neural device and also receives data from the other neural devices through the synapses. Also, the neural device may store the received data. In order to configure a desired system using neural devices, a number of neural devices may be needed.

Further, the neural devices may form multiple layers where a neural device of one layer may be connected to a neural device of another layer. As such, neural devices of multiple layers may be connected to one another to form a neural network. For example, a deep neural network formed using multiple layers is known to be more efficient than other neural networks. Regarding the deep neural network, algorithms such as Restricted Boltzmann Machine (RBM) and/or Error Back Propagation (BP) are known as methods for training synaptic devices constituting the deep neural network.

In a neural network including multiple layers, multiple neural devices may form a neural array. The neural array may be interconnected with another neural array to form a neural network.

SUMMARY

In an exemplary embodiment, a neural array for forming a deep neural network is generally described. The exemplary neural array may include an array unit, a first processing unit, and a second processing unit. The array unit may include one or more synaptic devices arranged in one or more rows and columns. The first processing unit may be configured to input a row input signal to the array unit and receive a row output signal from the array unit. The second processing unit may be configured to input a column input signal to the array unit and receive a column output signal from the array unit. The array unit may have multiple selectable array values. For example, the array unit may include a first array value and a second array value.

In an exemplary embodiment, the array unit may select the first array value. The array unit may generate an output signal based on an input signal and the first array value. The first processing unit or the second processing unit may receive the output signal from the array unit and generate a new input signal based on the received output signal. Then, the array unit may select the second array value. When the array unit selects the second array value, the first processing unit or the second processing unit may input the newly generated input signal to the array unit that selects the second array value.

In an additional example, each of the one or more synaptic devices of the array unit may be configured to form a NAND flash structure. The one or more synaptic devices may include a Floating Gate Metal Oxide Silicon Field Effect Transistor (FG MOSFET).

In an additional example, the array unit may be configured to operate in a time-division multiplexing mode. For example, the array unit may be configured to use the first array value in a first time section and the second array value in a second time section after the first time section.

In an additional example, the neural array may be configured to implement a RBM. Since the neural array implements a RBM, multiple neural array values can be updated.

In an additional example, the neural array may update multiple neural array values by implementing a BP process.

In an example, a method performed in a neural array configured to form a deep neural network and implement a RBM is generally described. Such neural array may have multiple selectable array values, and be configured to cause an output signal based on an array value to be an input signal for another array value. The exemplary method may include updating a first array value and updating a second array value based on the updated first array value.

The updating of the first array value may include: selecting the first array value; generating a reconstructed first input signal based on a first output signal and the first array value; generating a reconstructed first output signal based on the reconstructed first input signal and the first array value; and updating the first array value based on a first input signal, the first output signal, the reconstructed first input signal, and the reconstructed first output signal.

The updating of the second array value may include: generating a second input signal based on the first input signal and the updated first array value; and selecting the second array value.

In an example, a method to perform a BP process in a neural array forming a deep neural network is generally described. Such a neural array may have multiple selectable array values, and be configured to cause an output signal based on an array value to be an input signal for another array value. The exemplary method may include: receiving an input signal; performing forward propagation to generate an output signal based on the received input signal and multiple array values; obtaining an error value based on the output signal and a target value for the output signal; performing back propagation based on the error value and the multiple array values; and updating the multiple array values based on results of the forward propagation and the back propagation.

The above-described summary is provided for illustration purposes only and does not intend to limit in any ways. In addition to the exemplary embodiments, examples, and features described above, additional embodiments, examples, and features will become apparent by referring to the drawings and the following detailed description.

BRIEF DESCRIPTION OF THE DRAWINGS

The foregoing features and other features of the present disclosure will be sufficiently apparent from the following descriptions and the appended claims with reference to the accompanying drawings. These drawings merely illustrate several exemplary embodiments in accordance with the present disclosure. Therefore, they should not be understood as limiting the present disclosure. The present disclosure will be described in more detail with reference to the accompanying drawings.

FIG. 7 is a flowchart illustrating an exemplary process of implementing BP in a neural array in accordance with at least some examples of the present disclosure.

DETAILED DESCRIPTION

Figure 1:
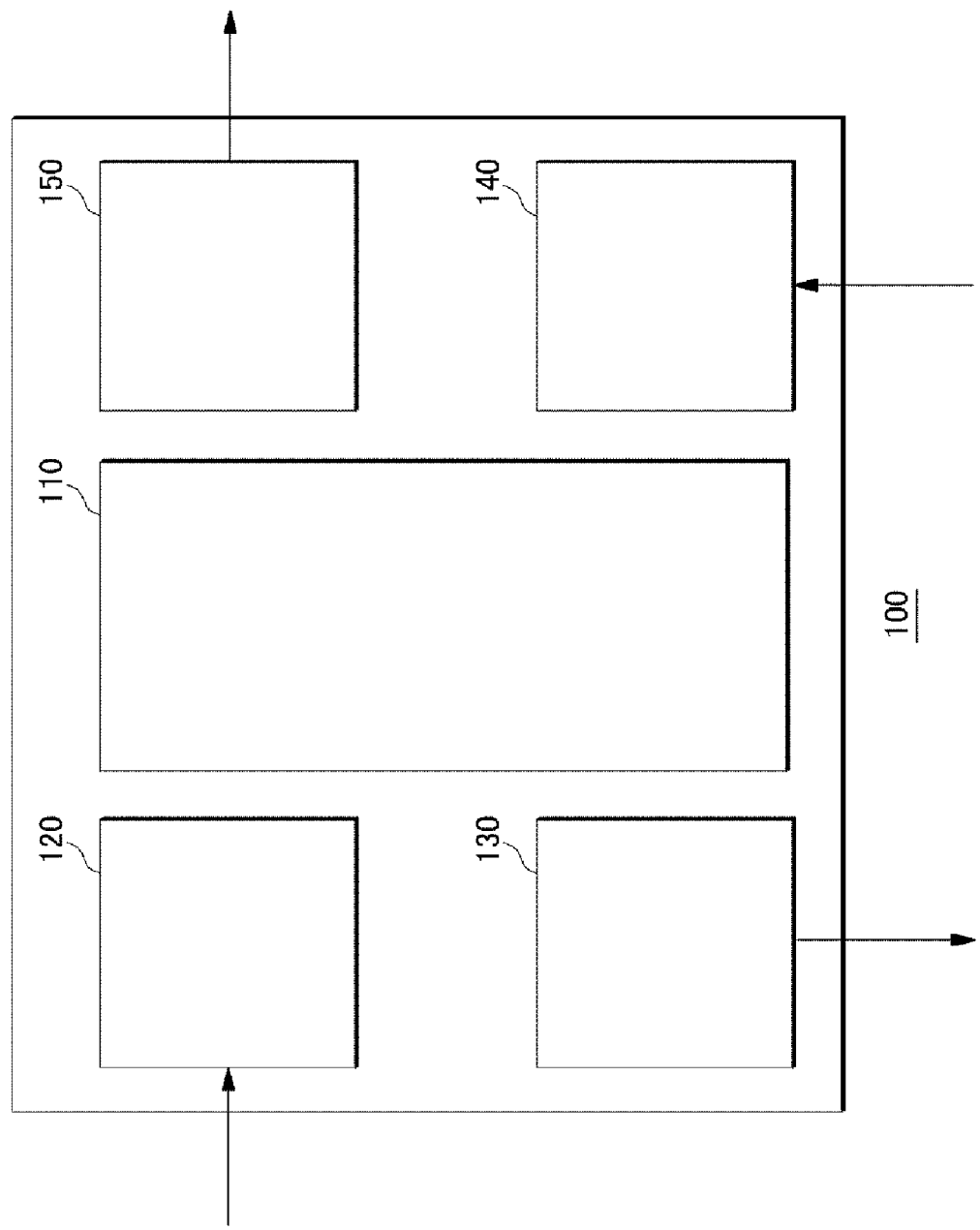
FIG. 1 is a block diagram schematically illustrating an exemplary synaptic device in accordance with at least some examples of the present disclosure.

In the following detailed description, reference is made to the accompanying drawings, which constitutes a part of the present disclosure. In the drawings, similar symbols generally identify similar components unless context dictates otherwise. The illustrative embodiments described in the detailed description, drawings, and claims are not meant to be limiting. Other embodiments may be used and other changes may be made, without departing from the spirit and scope of the subject matter presented herein. It will be readily understood that the aspects of the present disclosure, as generally described herein and illustrated in the drawings, can be arranged, substituted, combined, separated, and designed in a wide variety of different configurations, all of which are implicitly contemplated herein.

The present disclosure generally relates to, inter alia, a neural array including multiple synaptic devices and a method to operate the neural array.

Briefly stated, a neural array is generally described. A neural array according to some embodiments of the present disclosure may include an array unit, a first processing unit, and a second processing unit. The array unit may include one or more synaptic devices arranged in one or more rows and columns. Further, the array unit may have multiple selectable array values. In order for the array unit to have multiple selectable array values, each of the one or more synaptic devices of the array unit may be configured to form a NAND flash structure. The first processing unit may be configured to input a row input signal to the array unit and receive a row output signal from the array unit. The second processing unit may be configured to input a column input signal to the array unit and receive a column output signal from the array unit.

When the array unit selects a first array value, the first processing unit or the second processing unit may receive an output signal based on the first array value from the array unit. Then, when the array unit selects a second array value, the first processing unit or the second processing unit may use the output signal based on the first array value and input an input signal to the array unit that selects the second array value. As such, an output signal based on an array value may become an input signal for another array value, and, thus, a neural array of multiple layers without interconnection among the layers can be implemented.

Under the control of the neural array according to some embodiments of the present disclosure, a Restricted Boltzmann Machine may be implemented. The neural array may select the first array value. The neural array may generate a first output signal based on a first input signal and the first array value. The neural array may generate a reconstructed first input signal using the first output signal and the first array value and may also generate a reconstructed first output signal using the reconstructed first input signal and the first array value. The neural array may update the first array value based on the first input signal, the first output signal, the reconstructed first input signal, and the reconstructed first output signal. Then, the neural array may generate a second input signal based on the first input signal and the updated first array value and select a second array value. The neural array may update the second array value using the second input signal in the same way as the neural array updates the first array value.

The exemplary neural array may update the multiple array values by the RBM and then perform a Back Propagation Process to further update the updated multiple array values.

FIG. 1 is a block diagram schematically illustrating an exemplary synaptic device 100 in accordance with at least some embodiments of the present disclosure. The exemplary synaptic device 100 may include a synaptic module 110, a first input unit 120, a first output unit 130, a second input unit 140, and a second output unit 150. The synaptic device 100 may receive a signal from one or more other synaptic devices, and may generate a signal based on the received signal and transmit the generated signal to one or more other synaptic devices. The signals transmitted, received and generated by the synaptic device 100 may be various types of signals, and the transmitted, received and generated signals may be identical to or different from each other. In an example, if the synaptic device 100 uses a pulse signal, the synaptic device 100 may increase or decrease internal potential and generate a new output signal based on the internal potential. When the synaptic device 100 uses a pulse signal, information can be represented as a pulse width of the pulse signal. In another example, if the synaptic device 100 uses an analog signal, information may be represented using the intensity of a voltage or current of the analog signal. In yet another example, if the synaptic device 100 uses a digital signal, information may be represented as one or more discrete values.

The synaptic module 110 may have a coefficient value. When the synaptic device 100 receives an input signal, the synaptic module 110 may generate an output signal by applying the coefficient value to the received input signal. In some embodiments, the synaptic module 110 may have multiple selectable coefficient values. For example, the synaptic module 110 may have a first coefficient value, a second coefficient value, . . . , and a nth coefficient value. The synaptic device 100 may select and used one of the multiple coefficient values based on predetermined conditions. In some examples, the synaptic module 110 may be configured to operate in a time-division multiplexing mode. The synaptic module 110 may select the first coefficient value in a first time section according to the time-division multiplexing mode. The synaptic module 110 may select a second coefficient value in a second time section after the first time section. As such, the synaptic module 110 may select a nth coefficient value in a nth time section according to the time-division multiplexing mode.

In some examples, the synaptic module 110 may include multiple synaptic elements connected in series. In these examples, each of the synaptic elements may have a specific coefficient value. In some examples, each of the synaptic elements may be configured with a Floating Gate Metal Oxide Silicon Field Effect Transistor (FG MOSFET). Since a floating gate of the FG MOSFET is available to store information therein, a specific coefficient value of a synaptic element can be determined based on the information stored in the floating gate, thereby the synaptic module 110 may have multiple coefficient values.

The multiple synaptic elements connected in series in the synaptic module 110 may form a NAND flash structure. Since the multiple synaptic elements form a NAND flash structure, the number of synaptic elements integrated per unit area may be increased.

The first input unit 120 may receive a first input signal from the external or another synaptic device. The first output unit 130 may be configured to output a first output signal generated based on the first input signal received by the first input unit 120 and the coefficient value of the synaptic module 110. Further, the second input unit 140 may receive a second input signal. In some examples, the second input signal may be generated based on the first output signal output by the first output unit 130. The second output unit 150 may be configured to output a second output signal generated based on the coefficient value of the synaptic module 110. As such, the synaptic device 100 may include the second input and output units 140 and 150 distinct from the first input and output units 120 and 130. An example of the input and output of the synaptic device 100 will be described more clearly with reference to FIGS. 2A through 2E, and an architecture of a neural array formed using the synaptic devices 100 will be described more clearly with reference to FIG. 4 and FIG. 5.

Figure 2A:
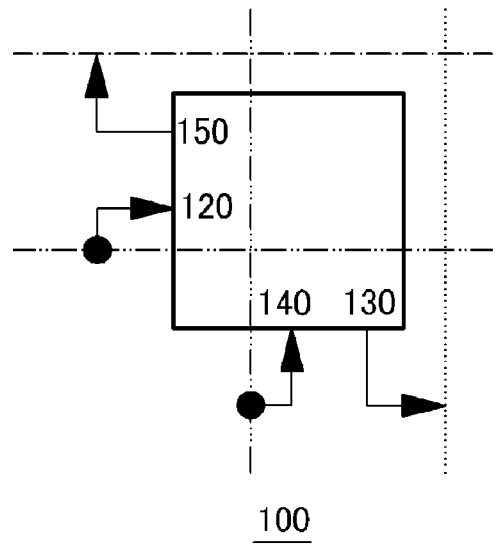
FIGS. 2A, 2B, 2C, 2D, and 2E are block diagrams schematically illustrating an operation of the exemplary synaptic device illustrated in FIG. 1.

FIGS. 2A through 2E are block diagrams schematically illustrating an operation of the exemplary synaptic device 100 illustrated in FIG. 1. FIG. 2A illustrates that the synaptic device 100 receives an input signal from two input lines and outputs an output signal to two output lines. More specifically, referring to FIG. 2A, the first input unit 120 of the exemplary synaptic device 100 may receive an input signal from a row input line. The first output unit 130 of the synaptic device 100 may output an output signal generated based on the input signal received by the first input unit 120 to a column output line. The second input unit 140 may receive an input signal from a column input line. In some examples, the input signal received by the second input unit 140 may be associated with the output signal output by the first output unit 130. The second output unit 150 of the synaptic device 100 may output an output signal generated based on the input signal received by the second input unit 140 to a row output line.

Figure 2B:
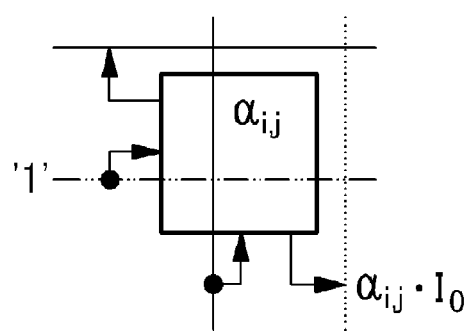
Figure 2C:
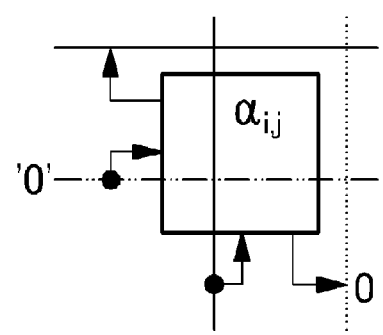

FIG. 2B to FIG. 2E illustrate an example of the input and output of the synaptic device 100 according to an example where the synaptic device 100 has a coefficient value α. As illustrated in FIG. 2B, the first input unit 120 may receive an input signal corresponding to a logic value "1" from the row input line. In response to the received input value "1," the first output unit 130 of the synaptic device 100 may output an output current of $\alpha \cdot I_0$ to the column output line, as illustrated in FIG. 2B, in response. The first input unit 120 may receive an input signal corresponding to a logic value "0," as illustrated in FIG. 2C. In response to the received input value "0," the first output unit 130 of the synaptic device 100 may output an output current of 0, as illustrated in FIG. 2C.

Figure 2D:
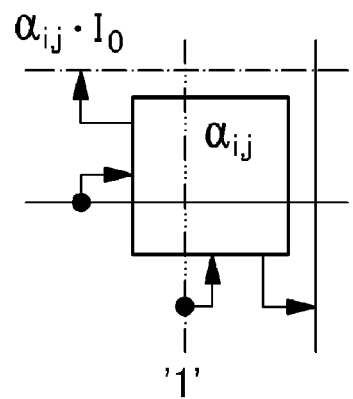
Figure 2E:
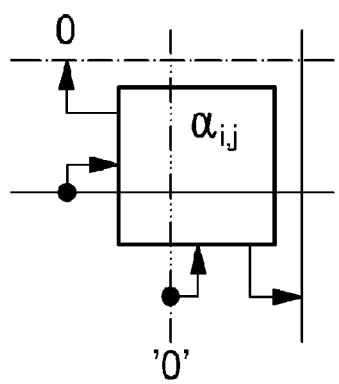

Likewise, as illustrated in FIG. 2D, the second input unit 140 may receive an input signal corresponding to the logic value "1" from the column input line. In response to the received input value "1," the second output unit 150 of the synaptic device 100 may output an output current of $\alpha \cdot I_0$ to the row output line, as illustrated in FIG. 2B. The second input unit 140 may receive an input signal corresponding to the logic value "0" as illustrated in FIG. 2E. In response to the received input value "0," the second output unit 150 of the synaptic device 100 may output an output current of 0, as illustrated in FIG. 2E. Although FIG. 2B to FIG. 2E illustrate that the synaptic device has a coefficient value of α, the synaptic device 100 may also have other coefficient values in addition to the coefficient value of α, and may select one of the multiple coefficient values and use the selected coefficient value. An exemplary circuit diagram for the synaptic device 100 having multiple coefficient values will be described in more detail with reference to FIG. 3.

Figure 3:
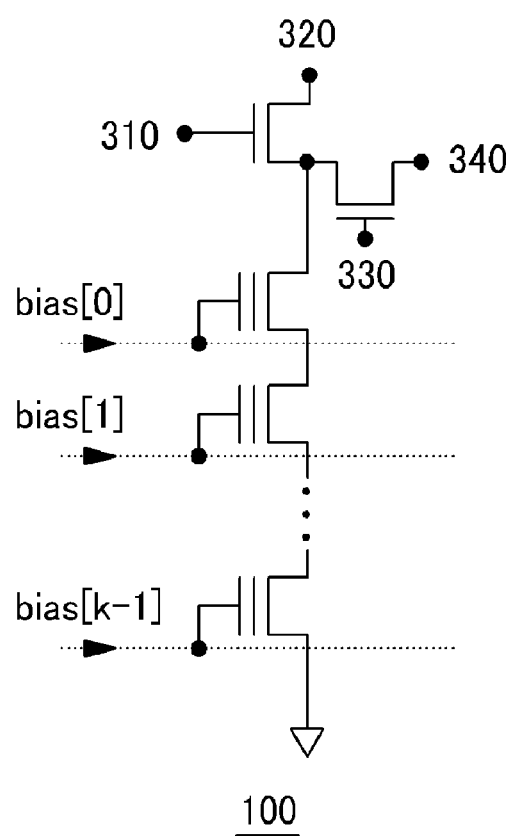
FIG. 3 is an exemplary circuit diagram for the exemplary synaptic device illustrated in FIG. 1.

FIG. 3 is an exemplary circuit diagram for the exemplary synaptic device illustrated in FIG. 1. It will be understood by those skilled in the art that the circuit diagram for the synaptic device 100 illustrated in FIG. 3 is a schematic diagram and can be modified in various ways in an actual circuit. Referring to FIG. 3, the synaptic device 100 includes two MOSFETs and multiple FG MOSFETs. When an input signal is received by a gate input port 310 of a MOSFET, an output signal is output through an output port 320 corresponding thereto, and when an input signal is received at a gate input port 330 of a MOSFET, an output signal is output through an output port 340 corresponding thereto. Each of the multiple FG MOSFETs may include coefficient information, and as illustrated in FIG. 3, the multiple FG MOSFETs are connected in series. Due to a structure of the FG MOSFETs connected in series, the number of synaptic devices integrated per unit area can be increased.

Bias signals bias [0], bias [1], etc. are input to a gate port of each of the multiple FG MOSFETs, and these bias signals may determine whether a FG MOSFET performs a reading operation to read information stored therein or a pass operation to operate as a closed circuit. The synaptic device 100 as illustrated in FIG. 3 may operate in a time-division multiplexing mode. For example, in a first time section according to the time-division multiplexing mode, a FG MOSFET in a first stage may receive bias $[0]=V_{read}$ where the $V_{read}$ may be a value suitable to read information stored in a floating gate of the FG MOSFET. Meanwhile, a gate of a FG MOSFET in a second stage may receive bias $[1]=V_{pass}$ where the $V_{pass}$ may be a value suitable for the FG MOSFET to operate as a closed switch regardless of information stored in a floating gate of the FG MOSFET. As such, in the first time section, FG MOSFETs in the stages other than the FG MOSFET in the first stage may receive $V_{pass}$ through the gates to operate as closed switches. In the first time section, the input port 310 may receive an input signal and the output port 320 may output an output signal based on the received input signal and coefficient information of the FG MOSFET in the first stage. In some examples, the input port 330 may receive a new input signal based on the signal output by the output port 320. When the input port 330 receives the new input signal, the input port 310 may not receive an input signal, and a MOSFET corresponding to the input port 310 and the output port 320 may operate as an open switch.

As such, when the input port 330 receives the new input signal after the output port 320 outputs the output signal, the output port 340 may output a new output signal based on the received input signal and the coefficient information of the FG MOSFET in the first stage.

Figure 4:
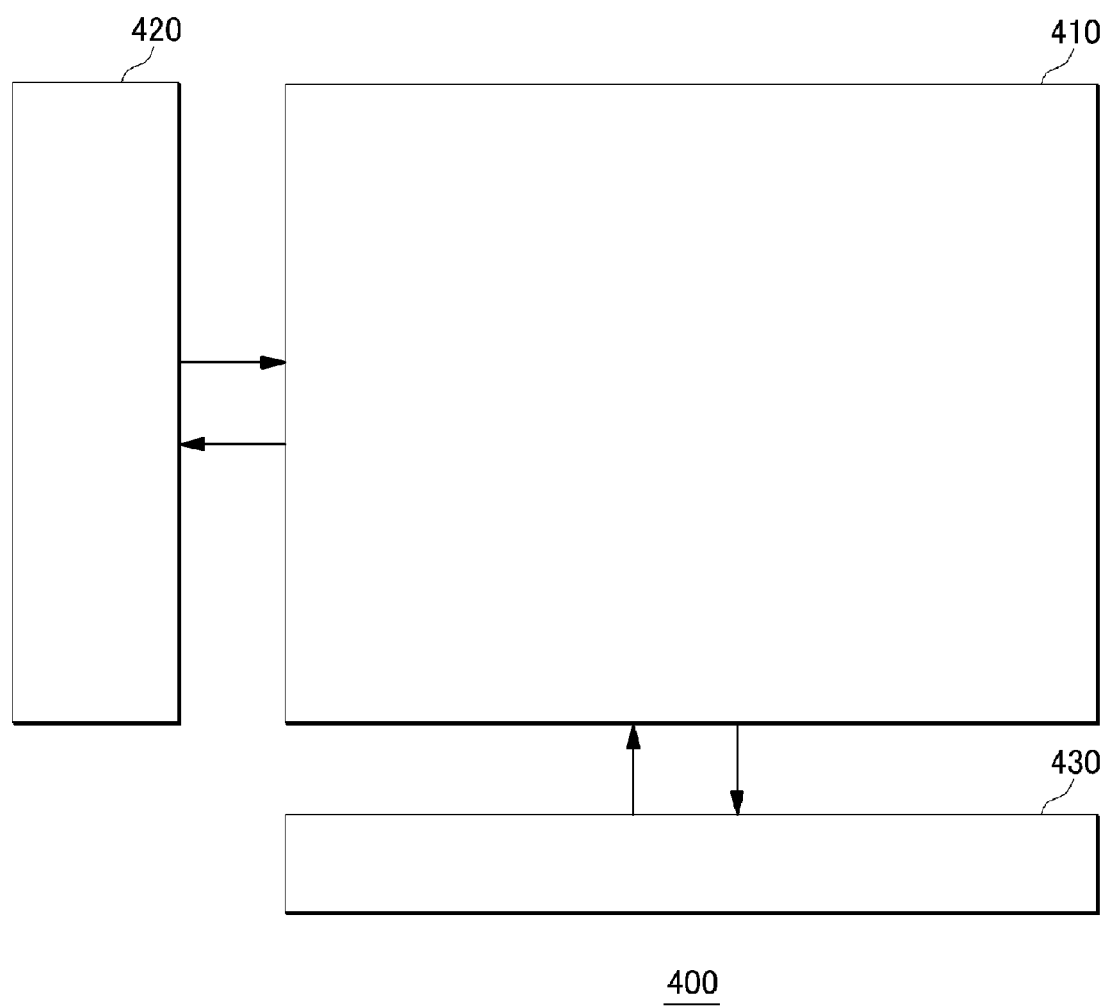
FIG. 4 is a block diagram schematically illustrating an exemplary neural array configured to form a deep neural network in accordance with at least some examples of the present disclosure.

FIG. 4 is a block diagram schematically illustrating an exemplary neural array 400 configured to constitute a deep neural network in accordance with at least some embodiments of the present disclosure. The neural array 400 may include an array unit 410, a first processing unit 420, and a second processing unit 430. In some examples, the array unit 410 may include one or more synaptic devices arranged in one or more rows and columns. In some examples, each of the one or more synaptic devices may have multiple selectable coefficient values as described with reference to FIG. 1 to FIG. 3. As described above, the synaptic devices arranged in the respective rows and columns may be configured to receive an input signal of a corresponding row and output an output signal of a corresponding column based on a selected coefficient value and the received input signal of the corresponding row. Further, the synaptic devices may be configured to receive an input signal of a corresponding column and output an output signal of a corresponding row based on a selected coefficient value and the received input signal of the corresponding column. As such, the array unit 410 may have array values including coefficient values included in the one or more synaptic devices arranged in one or more rows and columns. Since each synaptic device has multiple selectable coefficient values, the array unit 410 may also have multiple selectable array values.

As illustrated in FIG. 4, the first processing unit 420 may be coupled to the array unit 410. The first processing unit 420 may input a row input signal corresponding to each row of the array unit 410 into the array unit 410. In some examples, the first processing unit 420 may include one or more processing units connected corresponding to the respective rows of the array unit 410, and each of the one or more processing units may input a row input signal into a corresponding row of the array unit 410. The array unit 410 may output one or more column output signals based on the one or more row input signals received from the first processing unit 420 and an array value selected by the array unit 410.

As illustrated in FIG. 4, the second processing unit 430 may also be coupled to the array unit 410. The second processing unit 430 may receive one or more column output signals corresponding to one or more columns of the array unit 410. Further, the second processing unit 430 may be configured to generate column input signals for the respective columns based on the received one or more column output signals. In some examples, the second processing unit 430 may include one or more processing units connected corresponding to the respective columns of the array unit 410, and each of the one or more processing units may input a column input signal into a corresponding column of the array unit 410. The array unit 410 may output multiple row output signals based on the one or more column input signals received from the second processing unit 430 and an array value selected by the array unit 410.

In some examples, the array unit 410 may receive a row input signal from the first processing unit 420. The array unit 410 may be configured to output a column output signal to the second processing unit 430 based on the row input signal received from the first processing unit 420 and a selected array value. Further, the array unit 410 may receive a column input signal from the second processing unit 430. The array unit 410 may be configured to output a row output signal to the first processing unit 420 based on the column input signal received from the second processing unit 430 and a selected array value.

In the exemplary neural array 400 according to the present disclosure, a neural network in which multiple layers are stacked may be constructed. That is, the first processing unit 420 and the second processing unit 430 may correspond to layers of the neural network. The array unit 410 may correspond to a synapse connecting the layers. In an example, the array unit 410 may include a first array value and a second array value. When the array unit 410 selects the first array value, for example, the first processing unit 420 may correspond to a first layer and the second processing unit 430 may correspond to a second layer. When the array unit 410 receives an input signal from the first processing unit 420 (corresponding to the first layer), the array unit 410 may generate an output signal based on the input signal and the first array value and output the generated output signal to the second processing unit 430 (corresponding to the second layer).

Then, the array unit 410 may select the second array value. When the array unit 410 selects the second array value, the second processing unit 430 may still correspond to the second layer and the first processing unit 420 may correspond to a third layer. The second processing unit 430 may generate a new input signal based on the output signal received from the array unit 410. Meanwhile, when the array unit 410 selects the second array value, the second processing unit 430 (corresponding to the second layer) may input the newly generated input signal into the array unit 410 and the array unit 410 may generate a new output signal based on the new input signal and the second array value and output the new output signal to the first processing unit 420 (corresponding to the third layer).

As described above, the neural network in which multiple layers are stacked can be implemented in a neural array IC using the neural array 400 according to some embodiments of the present disclosure and interconnection required between neural array ICs may not be needed. It will be understood by those skilled in the art that the method of forming the neural network in which multiple layers are stacked by the neural array 400 according to the present disclosure is not limited to the above-described examples and can be modified without departing from the spirit or scope of the subject matter presented herein.

In some embodiments, each of the one or more synaptic devices of the array unit 410 may be configured to form a NAND flash structure, and, thus, the number of synaptic devices integrated per unit area can be increased. Such a synaptic device may include, for example, a FG MOSFET.

Figure 5:
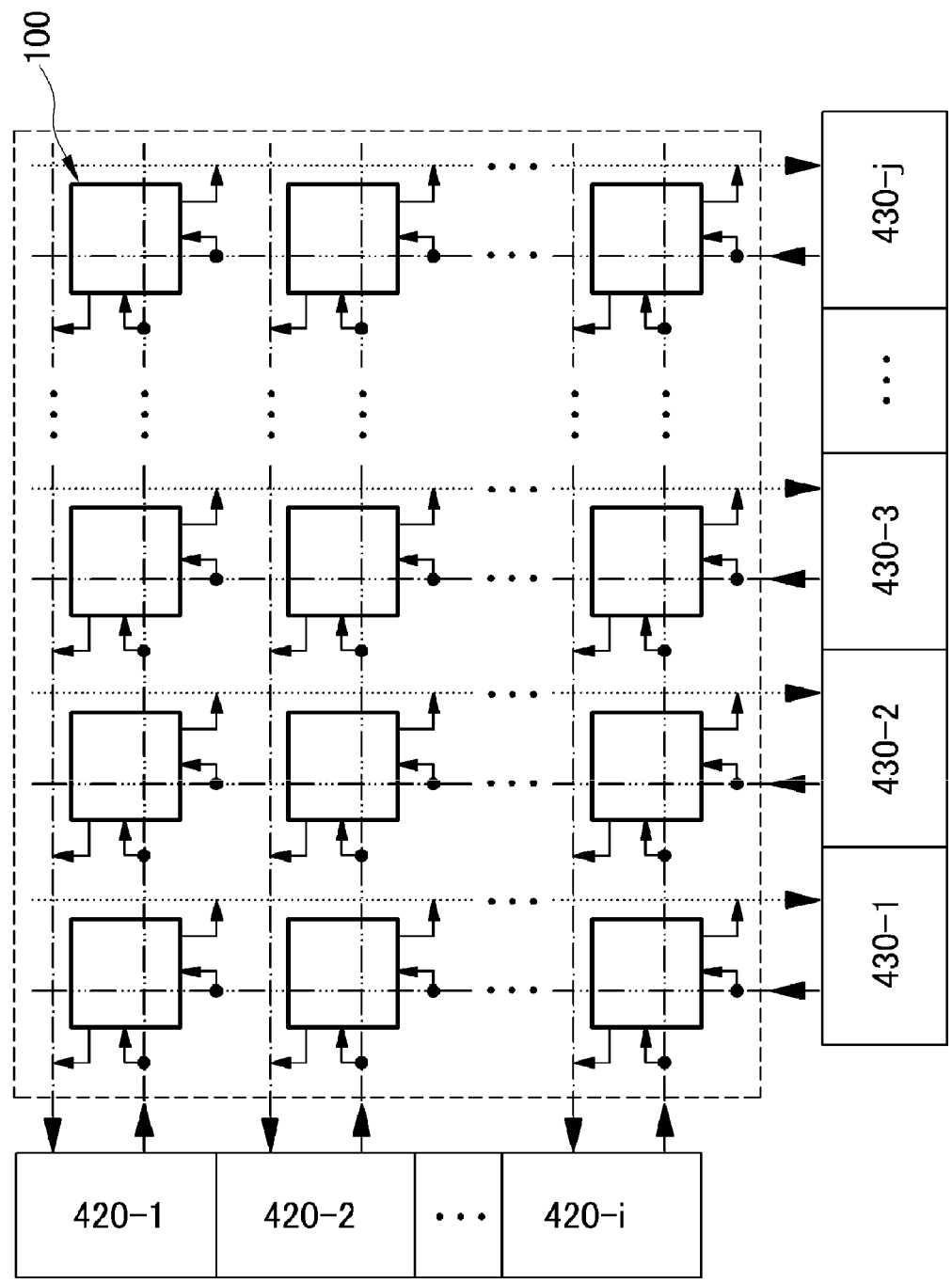
FIG. 5 is a specific block diagram for the neural array illustrated in FIG. 4 and including synaptic devices.

FIG. 5 is a specific block diagram for the neural array 400 illustrated in FIG. 4 and including synaptic devices. Hereinafter, examples of implementing a Restricted Boltzmann Machine (RBM) and a Back Propagation (BP) process using the exemplary neural array 400 according to the present disclosure will be described.

RBM (Restricted Boltzmann Machine)

Referring to FIG. 5, i×j number of synaptic devices, such as the synaptic device 100 illustrated in FIG. 1, are arranged in i rows and j columns in the array unit 410 of the neural array 400. The synaptic devices of the neural array 400 have coefficient values, respectively. In some examples, a synaptic device arranged in a first row and a first column may have a coefficient value $\alpha_{11}$, and a synaptic device arranged in an ith row and a jth column may have a coefficient value $\alpha_{ij}$. In these examples, the array unit 410 may have a first array value A, and A can be represented by the following Equation 1.

$$A = \begin{pmatrix} \alpha_{11} & \alpha_{12} & \cdots & \alpha_{1i} \\ \alpha_{21} & \cdot & & \alpha_{2i} \\ & & \cdot & \\ & & & \cdot \\ \alpha_{j1} & \cdots & & \alpha_{ji} \end{pmatrix}$$ [Equation 1]

The first processing unit 420 may include i processing units 420-1, 420-2, . . . , 420-i and may input i row input signals $x_1, x_2, \ldots, x_i$ into the array unit 410. The second processing unit 430 may include j processing units 430-1, 430-2, . . . , 430-j, and as the i row input signals $x_1, x_2, \ldots, x_i$ are input from the first processing unit 420, each of the processing units 430-1, 430-2, . . . , 430-j may receive $I_{out,1}, \ldots, I_{out,j}$, and $I_{out,j}$ can be represented by the following Equation 2.

$$I_{out,j} = \sum_{i=1}^{n} x_i \times \alpha_{i,j} I_0$$ [Equation 2]

where $I_0$ represents a unit output current from a synaptic device and n represents a positive integer. The second processing unit 430 may calculate or determine j number of column input signals $y_1, y_2, \ldots, y_j$ based on $I_{out,j}$. In an example, when the second processing unit 430 determines a value of $y_j$, the following Probability Equation 3 can be used.

$$P(y_j=1)=1/(1+\exp(-\Sigma \alpha_{i,j} x_i))$$ [Equation 3]

Further, the second processing unit 430 may input j column input signals $y_1, y_2, \ldots, y_j$ into the array unit 410, and then, the array unit 410 may output an output signal $I_{out,i}$ to the first processing unit 420, and $I_{out,I}$ can be represented by the following Equation 4.

$$I_{outi} = \sum_{j=1}^{m} y_j \times \alpha_{i,j} I_0$$ [Equation 4]

$$I_{out} = Y \cdot A^T$$

Herein, Y represents a matrix corresponding to j column input signals, $A^T$ represents a transposed matrix of an array A, and m represents a positive integer.

The first processing unit 420 may calculate or determine i reconstructed row input signals $x'_1, x'_2, \ldots, x'_i$ based on $I_{out,i}$. In an example, it will be understood by those skilled in the art that when the first processing unit 420 determines a value of $x'_i$, Equation 3 can be appropriately modified for use. The second processing unit 430 may obtain j reconstructed column input signals $y'_1, y'_2, \ldots, y'_j$ based on the i reconstructed row input signals $x'_1, x'_2, \ldots, x'_I$ and the first array value A in a similar way as described in the above. The neural array 400 may update the first array value A based on the row input signals $x_1, x_2, \ldots, x_i$, the column input signals $y_1, y_2, \ldots, y_j$, the reconstructed row input signals $x'_1, x'_2, \ldots, x'_I$, and the reconstructed column input signals $y'_1, y'_2, \ldots, y'_j$. In an example, the first array value A can be updated based on the following Equation 5.

$$\Delta \alpha_{i,j} = <x_i y_j> - <x'_i y'_j>$$ [Equation 5]

In some embodiments, each of the multiple synaptic devices may have multiple selectable coefficient values and the array unit 410 may also have multiple selectable array values. The neural array 400 may operate in a time-division multiplexing mode and the array unit 410 may select the first array value A including $\alpha_{ij}$ as a component in a first time section and update the first array value A as described above, and the updated first array value is represented as A'. In the above-described example, A is described as being updated using a group of input signals $x_1, x_2, \ldots, x_i$, but is not limited thereto, and A may be updated multiples times using multiple groups of input signals.

After the first array value is updated, the first processing unit 420 may input i row input values $x_1, x_2, \ldots, x_i$ into the array unit 410 and the array unit 410 may output a new column output signal to the second processing unit 430 using the updated first array value A' and Equation 2, and the second processing unit 430 may obtain new column input signals $y_1, y_2, \ldots, y_j$ using Equation 3.

In a second time section after the first time section, the second array value B including $\beta_{ij}$ as a component may be selected and then may be updated using the new column input signals $y_1, y_2, \ldots, y_j$. An operation of updating the array value B by the neural array 400 is similar to the operation of updating the array value A and will be briefly described as follows. The first processing unit 420 may obtain i row input signals $z_1, z_2, \ldots, z_i$ based on j column input signals $y_1, y_2, \ldots, y_j$ and B, and the second processing unit 430 may obtain $y'_1, y'_2, \ldots, y'_j$ based on $z_1, z_2, \ldots, z_i$ and B, and then, the first processing unit 420 may also obtain $z'_1, z'_2, \ldots, z'_I$ using $y'_1, y'_2, \ldots, y'_j$ and B. The second array value B may be updated using $y_1, y_2, \ldots, y_j, z_1, z_2, \ldots, z_i$, $y'_1, y'_2, \ldots, y'_j$, and $z'_1, z'_2, \ldots, z'_i$. As such, the second array value B can be updated multiples times using multiple groups of input signals.

Figure 6:
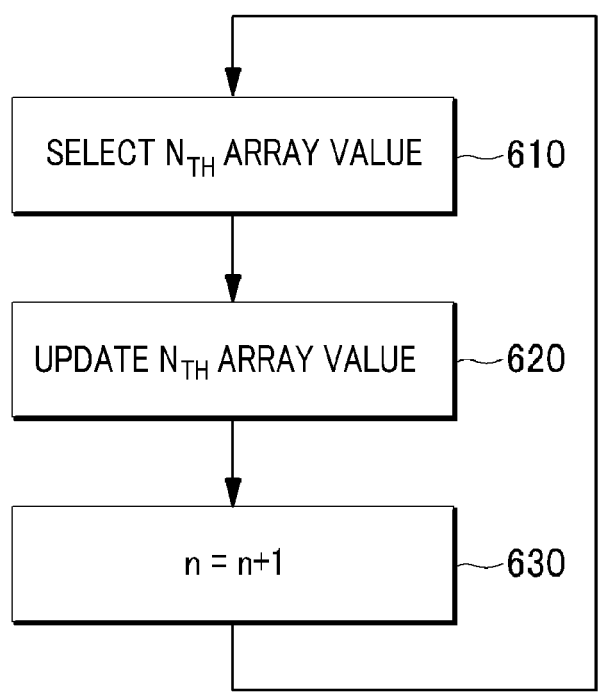
FIG. 6 is a flowchart illustrating an exemplary process of implementing RBM in a neural array in accordance with at least some examples of the present disclosure.

FIG. 6 is a flowchart illustrating an example process of implementing RBM in a neural array in accordance with at least some embodiments of the present disclosure. A process 600 illustrated in FIG. 6 may include one or more operations, functions, or actions as shown in blocks 610, 620 and/or 630. These operations, functions, or actions can be performed by the neural array 400 described above with reference to, e.g., FIG. 4. The blocks do not intend to limit the present disclosure to the described embodiments. For example, it will be appreciated by those skilled in the art that as for the present process disclosed herein, functions performed in the process and method can be implemented in a different order. Further, the briefly described operations are provided only for purposes of illustration and some of the operations can be selectively performed, can be combined with each other or can be divided up into additional operations without departing from the spirit or scope of the present disclosure. The process may start from a block 610 in which a nth array value is selected. In some examples, the neural array may operate in a time-division multiplexing mode, and may select a first array value in a first time section. The process 600 may continue from the block 610 to a block 620 in which the nth array value is updated.

In the block 620, the neural array may update the selected nth array value. In some examples, the neural array may output multiple column output signals using multiple row input signals and the first array value, and then may generate multiple column input signals in response to the multiple column output signals. In these examples, the neural array may output multiple row output signals based on the first array value and the multiple column input signals, and may reconstruct the multiple row input signals based on the multiple row output signals. Further, the neural array may output multiple column output signals based on the reconstructed multiple row input signals and the first array value, and then may reconstruct the multiple column input signals. Then, the neural array may update the first array value based on the multiple row input signals, the multiple column input signals, the reconstructed multiple row input signals, and the reconstructed multiple column input signals. The process 600 may continue from the block 620 to a block 630 in which a value of n is increased by 1.

In some examples, when the first array value is updated, the neural array may perform a process of updating a second array value based on the first array value. For example, the neural array may obtain multiple column input values based on the updated first array value. Then, the neural array may select the second array value and update the second array value as described above using the obtained multiple column input values and the second array value. In such manner, the process 600 can update multiple array values, sequentially.

BP (Back Propagation) process

FIG. 7 is a flowchart illustrating an exemplary process of implementing BP in a neural array in accordance with at least some embodiments of the present disclosure. A process 700 illustrated in FIG. 7 may include one or more operations, functions, or actions as shown in blocks 710, 720, 730, 740 and/or 750. These operations, functions, or actions can be performed by the neural array 400 described above with reference to, e.g., FIG. 4 and FIG. 5. In some additional examples, the process illustrated in FIG. 7 may be performed after the process 600 illustrated in FIG. 6. For example, the process 700 may be performed after multiple array values are updated by the RBM.

The blocks do not intend to limit the present disclosure to the exemplified embodiments. For example, it will be acknowledged by those skilled in the art that as for the present process disclosed herein, functions performed in the process and method can be implemented in a different order. Further, the briefly described operations are provided only for purposes of illustration and some of the operations can be selectively performed, can be combined with each other or can be divided up into additional operations without departing from the spirit or scope of the present disclosure. The process 700 may start from a block 710 in which an input signal is received. In some examples, the neural array may have multiple selectable array values as described in with reference to FIG. 4, and an output signal based on an array value may become an input signal for another array value. For example, the neural array may include a first array value A, a second array value B, and a third array value C, and may receive an input signal X. After the neural array receives the input signal, the process 700 may continue from the block 710 to a block 720.

In the block 720, the neural array may perform forward propagation based on the received input signal and multiple array values. In some examples, the neural array may output an output signal while selecting the first, second, and third array values A, B, and C in sequence, and a result of the forward propagation is as shown in the following Equation 6.

$$Y = X \cdot A$$

$$Z = Y \cdot B$$

$$O = Z \cdot C \quad \text{[Equation 6]}$$

As shown in Equation 6, when the neural array selects the first array value A, the neural array may determine Y based on the input signal X and the first array value A. Then, when the neural array selects the second array value B, the neural array may determine Z using the new input signal Y and the second array value B. Then, when the neural array selects the third array value C, the neural array may determine a final output signal O using the new input signal Z and the third array value C. The process 700 may continue from the block 720 to a block 730.

In the block 730, the neural array may obtain an error value based on the final output signal and a target value for the final output signal. In some examples, the neural array may obtain a difference ($E_O$=target value−O) between the target value estimated based on the input value X and the final output signal O as an error value $E_O$. The process 700 may continue from the block 730 to a block 740.

In the block 740, the neural array may perform back propagation based on the error value and multiple array values. In some exemplary embodiments, the neural array may perform back propagation based on the error value $E_O$, and results of the error value $E_O$ and back propagation are as shown in the following Equation 7.

$$E_o = \text{TARGET VALUE} - O$$

$$E_z = E_o \cdot C^T \text{ or sign } (E_o \cdot C^T)$$

$$E_y = E_z \cdot B^T \text{ or sign } (E_Z \cdot B^T) \quad \text{[Equation 7]}$$

where T represents a transposed matrix and sign represents a sign of a calculation result. The process 700 may continue from the block 740 to a block 750.

In the block 750, the neural array may update the multiple array values based on the results of the forward propagation and back propagation. In some examples, the neural array may update the first, second, and third array values based on the result X, Y, and Z of the forward propagation and the result $E_O$, $E_z$, and $E_y$ of the back propagation, and the adjusted array values can be determined based on, e.g., the following Equation 8.

$$\Delta C = Z^T \cdot E_O$$

$$\Delta B = Y^T \cdot E_z$$

$$\Delta A = X^T \cdot E_y \quad \text{[Equation 8]}$$

In the above-described examples, the neural array is described as having the three array values A, B, and C. However, it will be understood by those skilled in the art that the neural array may have a different number of array values and perform RBM and/or BP based on the array values.

Further, as described above, the neural array according to at least some embodiments of the present disclosure may have multiple selectable array values and may be configured to form a neural network in which multiple layers are stacked using the multiple array values. Furthermore, interconnection among the multiple layers may not be needed by using an output for an array value as an input for another array value. Also, a synaptic device included in the neural array is configured to form a NAND flash structure, and, thus, the number of synaptic devices integrated per unit area can be increased. Moreover, as described above, the neural array according to at least some embodiments of the present disclosure implements RBM and/or BP, and, thus, it is possible to perform training of the neural array.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited with the terms of the appended claims and the full scope of equivalents to which such claims are entitled. Further, it is also to be understood that the terminology used herein is for the purpose of describing particular embodiments only, and is not intended to be limiting.

With respect to the use of substantially any plural and/or singular terms herein, those skilled in the art can translate from the plural to the singular and/or from the singular to the plural as is appropriate to the context and/or application. The various singular/plural permutations may be expressly set forth herein for sake of clarity. Further, it will be understood by those skilled in the art that, in general, terms used herein and especially in the appended claims (e.g., the appended claims) are generally intended as "open" terms (e.g., the term "including" should be interpreted as "including but not limited to", the term "having" should be interpreted as "having at least", the term "includes" should be interpreted as "includes but is not limited to", etc.).

The subject matter described herein sometimes illustrates different components contained within or connected with different other components. It is to be understood that such depicted architectures are merely exemplary and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components Likewise, any two components so associated can also be viewed as being "operably connected" or "operably coupled" to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:
1. A neural array configured to form a deep neural network, comprising:
an array unit including i×j synaptic devices arranged in i rows and j columns;
a first processing unit coupled to the array unit, the first processing unit comprising i processing units configured to input i row input signals to the i×j synaptic devices of the array unit and receive row output signals from the i×j synaptic devices of the array unit; and
a second processing unit coupled to the array unit, and the second processing unit comprising j processing units configured to input j column input signals to the i×j synaptic devices of the array unit and receive column output signals from the i×j synaptic devices of the array unit,
wherein the array unit is configured to select an array value among multiple selectable array values including a first array value and a second array value, the first array value is a i×j matrix of first array coefficient values corresponding to the i×j synaptic devices, respectively, and the second array value is a i×j matrix of second array coefficient values corresponding to the i×j synaptic devices, respectively, and
after the second processing unit receives first output signals from the array unit which has selected the first array value, has received first input signals from the i processing units of the first processing unit and has generated the first output signals using the first array value and the first input signals, and the j processing units of the second processing unit input second input signals generated based on the first output signals to the array unit such that the array unit outputs second output signals to the first processing unit using the first array value and the second input signals,
after the first processing unit receives the second output signals from the array unit which has received second input signals from the j processing units of the second processing unit and has generated the second output signals using the first array value and the second input signals:
the i processing units of the first processing unit generates third input signals based on the second output signals; and
the i processing units of the first processing unit input the third input signals to the array unit such that the array unit outputs third output signals to the second processing unit using the first array value and the third input signals; and
after the second processing unit receives the third output signals from the array unit which has received third input signals from the i processing units of the first processing unit and has generated the third output signals using the first array value and the third input signals:
the j processing units of the second processing unit generates fourth input signals based on the third output signals;
the array unit updates the first array value based on difference between a first operation and a second operation, the first operation being an operation of a product between the first input signals and the second input signals, and the second operation being an operation of a product between the third input signals and the fourth input signals; and
the j processing units of the second processing unit input the fourth input signals to the array unit that has the updated first array value.

2. The neural array of claim 1,
wherein each of the synaptic devices is configured to form a NAND flash structure.

3. The neural array of claim 1,
wherein the synaptic devices include a floating gate metal oxide silicon field effect transistor (FG MOSFET).

4. The neural array of claim 1,
wherein the array unit is configured to output column output signals to the second processing unit based on the i row input signals received from the first processing unit and output row output signals to the first processing unit based on the j column input signals received from the second processing unit.

5. The neural array of claim 1,
wherein the array unit is configured to operate in a time-division multiplexing mode, and
the array unit uses the first array value in a first time section and uses the second array value in a second time section after the first time section.

6. The neural array of claim 1,
wherein the neural array is configured to implement a Restricted Boltzmann Machine.

7. The neural array of claim 6,
wherein the neural array is configured to, after multiple array values including the first array value and the second array value are updated, performs a Back Propagation Process based on the updated multiple array values to further update the updated multiple array values.

8. The neural array of claim 1, wherein the j processing units of the second processing unit generates fourth input signals based on equation $$P(y_j=1)=1/(1+\exp(-\Sigma a_{ij} x_i)),$$

wherein $y_j$ is jth input signal of the fourth input signals, $x_i$ is ith input signal of the third input signals, and $a_{ij}$ is a coefficient value of the i×j matrix of second array coefficient values.

9. The neural array of claim 1, wherein:
after the j processing units of the second processing unit input the fourth input signals to the array unit that has the updated first array value, the array unit changes coefficient values of the synaptic devices from the updated first array value to the second array value.

* * * * *